(12) United States Patent
Stojic

(10) Patent No.: US 6,588,314 B1
(45) Date of Patent: Jul. 8, 2003

(54) SEALED BRAKE ACTUATOR

(75) Inventor: Steven M. Stojic, Holland, MI (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 09/958,918
(22) PCT Filed: Oct. 4, 2000
(86) PCT No.: PCT/US00/27291
§ 371 (c)(1),
(2), (4) Date: Oct. 11, 2001
(87) PCT Pub. No.: WO01/68429
PCT Pub. Date: Sep. 20, 2001

Related U.S. Application Data
(60) Provisional application No. 60/189,376, filed on Mar. 15, 2000.

(51) Int. Cl.[7] ................................................. F15B 21/02
(52) U.S. Cl. ................................................. 92/63; 92/82
(58) Field of Search .............................. 92/62, 63, 64, 92/78, 79, 80, 82; 91/441

(56) References Cited

U.S. PATENT DOCUMENTS
6,029,447 A * 2/2000 Stojic et al. .................... 92/79

FOREIGN PATENT DOCUMENTS
GB 2064651 A * 6/1981 .......... B60T/17/04
WO WO 95/25030 9/1995

* cited by examiner

Primary Examiner—Edward K. Look
Assistant Examiner—Thomas E. Lazo
(74) Attorney, Agent, or Firm—St. Onge Steward Johnston & Reens LLC

(57) ABSTRACT

A sealed air-operated brake actuator comprising a brake actuator divided into a spring chamber and a pressure chamber. An extra-large force compression spring is contained in the spring chamber. The spring chamber is fluidly exhausted through a one-way valve located in the end of an actuator rod extending out of the brake actuator. The large force compression spring overcomes any vacuum or pressure that might form within the spring chamber upon the release of the parking brake and the one-way valve relieves any pressure buildup in the spring chamber upon the release of the parking brake.

39 Claims, 8 Drawing Sheets

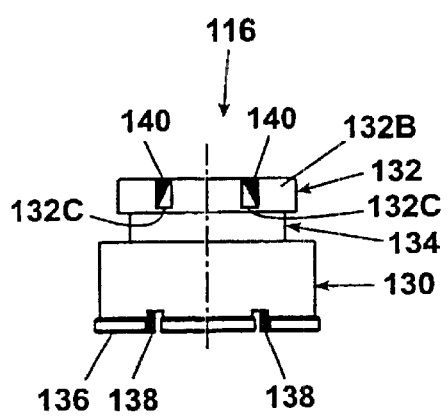
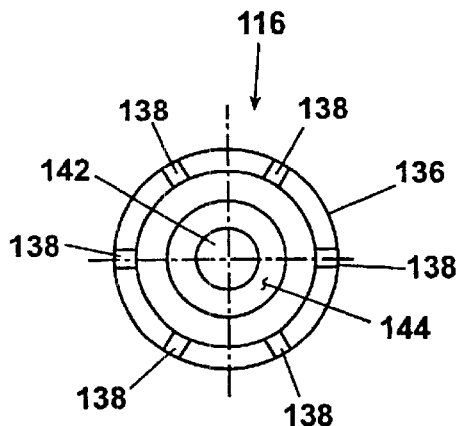
Fig. 3          Fig. 4
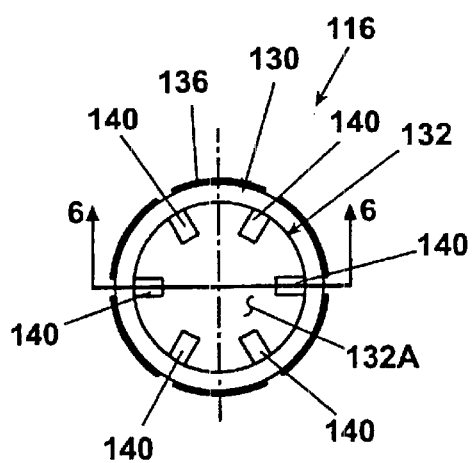
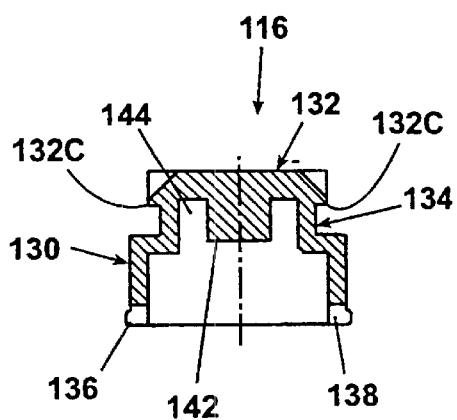
Fig. 5          Fig. 6

SEALED BRAKE ACTUATOR

RELATED APPLICATIONS

This application claims priority on International Application No. PCT/US00/27291, filed Oct. 4, 2000, which claims priority on U.S. Provisional Application Ser. No. 60/189,376, filed Mar. 15, 2000.

BACKGROUND OF THE INVENTION

1. Field of the Invention

The invention relates to air-operated spring brake actuators and, more particularly, to a spring brake actuator with a sealed spring chamber and an internal vent mechanism for relieving pressure build-up in the spring chamber during release of the brakes.

2. Related Art

Air-operated brake actuators are commonly used in heavy-duty vehicles, such as semi-tractor/trailer combinations, to urge the brake pads against the brake drum and thereby apply the brakes of the vehicle. In most heavy-duty applications in North America, an S-cam brake assembly is the preferred brake system.

Air-operated brake actuators are either the piston type or diaphragm type. Typically, air-operated diaphragm brake actuators are arranged in a tandem configuration comprising an air-operated service brake actuator for applying the normal operating brakes of the vehicle, and a spring brake actuator for applying the parking or emergency brakes of the vehicle. Both the service brake actuator and the spring brake actuator include a housing having an elastomeric diaphragm dividing the interior of the housing into two distinct fluid chambers. A piston brake actuator operates under the same principles, except that instead of a diaphragm, a piston reciprocates in a cylinder.

In the case of the service brake actuator, the service brake housing is divided into a pressure chamber and a pushrod chamber. The pressure chamber is fluidly connected to a source of pressurized air and the pushrod chamber mounts a pushrod, which is coupled to the brake assembly, whereby the introduction and exhaustion of pressurized air into the pressurized chamber reciprocates the pushrod into and out of the housing to apply and release the operating brakes.

In the case of a spring brake actuator, the housing is divided into a pressure chamber and a spring chamber. A pressure plate is positioned in the spring chamber between the diaphragm and a large force compression spring, whose opposing end abuts the housing. In one well-known configuration, an actuator rod extends through the pressure plate, through the diaphragm, into the pressure chamber, and through a dividing wall separating the spring brake actuator from the service brake actuator. The end of the actuator is fluidly connected to the pressure chamber of the service brake actuator.

Under parked conditions, where the spring brake actuator pressure is fluidly connected to atmosphere, the large force compression spring will force the diaphragm toward the dividing wall between the spring brake actuator and the service brake actuator. In this position, the parking or emergency brakes are applied, and the vehicle cannot be moved. To release the parking brake, the pressure chamber is closed to the atmosphere and pressurized air is introduced into the pressure chamber of the spring brake actuator which expands the pressure chamber, moving the diaphragm and pressure plate toward the opposing end of the spring brake actuator housing, thereby compressing the large force compression spring.

One problem with spring brake actuators of this design is that as the large force compression spring is compressed, the pressure chamber increases in volume and the spring chamber decreases in volume, resulting in a pressure increase in the spring chamber, unless a system is provided for relieving the pressure increase. The build-up of pressure in the spring chamber upon the release of the brake is highly undesirable in that any pressure build-up in the spring chamber must be offset by an increased pressure in the pressure chamber if the spring is to be fully compressed to fully release the brake.

The pressure build-up in the spring chamber is exacerbated in that most pressurized air systems for heavy-duty vehicles operate at an industry standard maximum pressure. The combined pressure of the spring and the increase in air pressure in the spring chamber cannot approach the maximum for the brake to operate properly. As the combined force associated with the pressure of the spring and the build-up of pressure in the spring chamber approach the force applied by the maximum pressure, the brake can fail to release, only partially release, or release very slowly, all of which are undesirable.

One solution to the pressure build-up in the spring chamber is to vent the spring chamber. The most common venting mechanism since the invention of the diaphragm brake actuator is to place holes in the housing around the spring chamber. A great disadvantage of such vent openings is that the interior of the spring chamber is thus exposed to the external environment. Environmental elements such as dirt, salt, and water can then enter the spring chamber and accelerate abrasion, corrosion, or wear on the various internal brake components, especially the spring. The damage to the internal brake components by the environmental elements can cause increased maintenance or premature failure of the spring and consequent replacement of the brake actuator.

An additional problem with directly externally venting the spring chamber is that a tractor/trailer is often parked for extended periods in a bay adjacent the dock. The bays are typically sloped and below grade. Under heavy rain or snow conditions, a bay can fill with water to a height above the vent opening and flood the interior of the spring chamber. Although the water would normally be expelled from the spring chamber through the vent openings as the brake is released, the flooding can accelerate corrosion and introduce other environmental hazards. In certain environmental conditions, the water can freeze, which may prevent release of the brake altogether.

Because of the problems associated with the introduction of environmental elements into the spring chamber through the vent openings, attempts have been made to seal the spring chamber to prevent the introduction of the various environmental elements. Sealing the spring chamber, however, creates additional problems in that a vacuum or a lower pressure tends to form in the spring chamber when the parking brakes are applied, unless a system is provided for relieving the low pressure. If the low pressure is great enough, it can slow the response time of the parking brakes, which is not desirable.

Prior solutions to eliminating the pressure build-up and vacuum creation in the spring chamber while keeping out environmental elements include fluidly connecting the spring chamber of the spring brake actuator to either chamber of the service brake actuator, placing a filter in the vent opening, and providing an internal fluid flow path from the spring chamber through the actuator rod and into the service brake pressure chamber. All of these solutions are compromises in that they do not provide complete solutions or introduce other complicating problems. For example, the filtered vent openings inherently permit external air to enter the brake, yielding a brake than is not completely sealed. As long as the filter is open there is some possibility that external elements can enter the brake through the filter such as if the brake actuator is submerged in a flooded bay. An example of a filtered vent opening is found in U.S. Pat. No. 6,029,447 issued Feb. 29, 2000. The internal fluid paths extending through the actuator require complex two-way valves that control the fluid flow to release a pressure build-up in the spring chamber while permitting the introduction of pressurized fluid to prevent a vacuum in the spring chamber. Examples of such two-way valves are disclosed in U.S. Pat. No. 5,722,311, issued Mar. 3, 1998 and U.S. Pat. No. 5,372,059, issued Dec. 13, 1994.

It is desirable to have an air-operated brake actuator including a spring brake actuator wherein the spring brake actuator is sealed and the pressure increase and vacuum formation are remedied without the need for complex or high maintenance valve and filter systems.

SUMMARY OF THE INVENTION

An air-operated brake actuator according to the invention comprises a sealed housing having a first end wall, a peripheral side wall, and a second end wall opposing the first end wall. The housing defined by its walls enclose a spring brake cavity. A movable member spans the spring brake cavity and divides it into a spring chamber located between the movable member and the first end wall and a pressure chamber located between the movable member and the second end wall. The pressure chamber is adapted for connection to a source of pressurized fluid so that the movable member is in a first position when the pressure chamber is pressurized and a second position when the pressure chamber is exhausted. A spring is disposed in the spring chamber and biases the movable member toward the second end wall away from the first position. In the first position, the spring is compressed, and in the second position, the spring is less compressed.

A hollow actuator rod has one end coupled to the movable member and another end extending through the second end wall to establish fluid communication through the actuator rod between the spring chamber and a side of the second end wall opposite the pressure chamber. Thus, when the movable member is in the first position (spring compressed), the hollow actuator rod is adapted to release the parking brake, and when the movable member is in the second position (spring less compressed), the hollow actuator rod is adapted to apply the parking brake. A one-way valve is positioned within the hollow actuator rod to permit the exhaust of fluid from the spring chamber through the hollow actuator rod and prevent the introduction of fluid through the hollow actuator rod into the spring chamber. Thus, when pressurized fluid is introduced into the pressure chamber, the movable member moves from the second position to the first position, thereby reducing the volume in the spring chamber. The one-way valve opens in response to pressure build-up in the spring chamber above a predetermined pressure to relieve the pressure build-up by permitting the pressurized fluid to pass from the spring chamber through the hollow actuator rod.

In one aspect of the invention, the spring is sized to apply a spring force sufficient to negate the impact of a retarding force attributable to the spring chamber in an application time defined by the time for the spring to move the movable member between the first and second positions upon exhaustion of air from the pressure chamber. Preferably, the retarding force equals the force opposing the expansion of the spring attributable to the pressure differential between the pressure chamber and the spring chamber when the movable member is in the second position. Typically, the retarding force will be at least 175 lbs.

In another aspect of the invention, the one-way valve comprises a body having a through opening and positioned within the hollow actuator rod to block fluid flow through the hollow actuator rod except through the through opening. A poppet is mounted within the through opening and movable between a sealing position where the poppet seals the through openings to prevent the flow of fluid through the body, and an open position where the poppet unseals the through opening to permit the flow of fluid through the body.

Preferably, the body comprises a manual collar extending into the body through the through opening, and the one-way valve further comprises a biasing device biasing the poppet into abutting relationship with the collar to seal the through opening to place the poppet in a sealing position. The biasing device applies a force to the poppet that can be overcome by a cracking pressure of less than 2 psig across the poppet. Preferably, the cracking pressure is in a range between 0.5 and 1 psig. Typically, the one-way valve will have a retainer mounted to the body and a spring disposed between the retainer and the poppet.

BRIEF DESCRIPTION OF THE DRAWINGS

In the drawings:

FIG. 3 is a side view of the poppet of FIG. 2;

FIG. 4 is a bottom view of the poppet of FIG. 3;

FIG. 5 is a top view of the poppet of FIG. 3;

FIG. 6 is a sectional view of the poppet taken along line 6—6 of FIG. 5;

DESCRIPTION OF THE PREFERRED EMBODIMENTS

Figure 1:
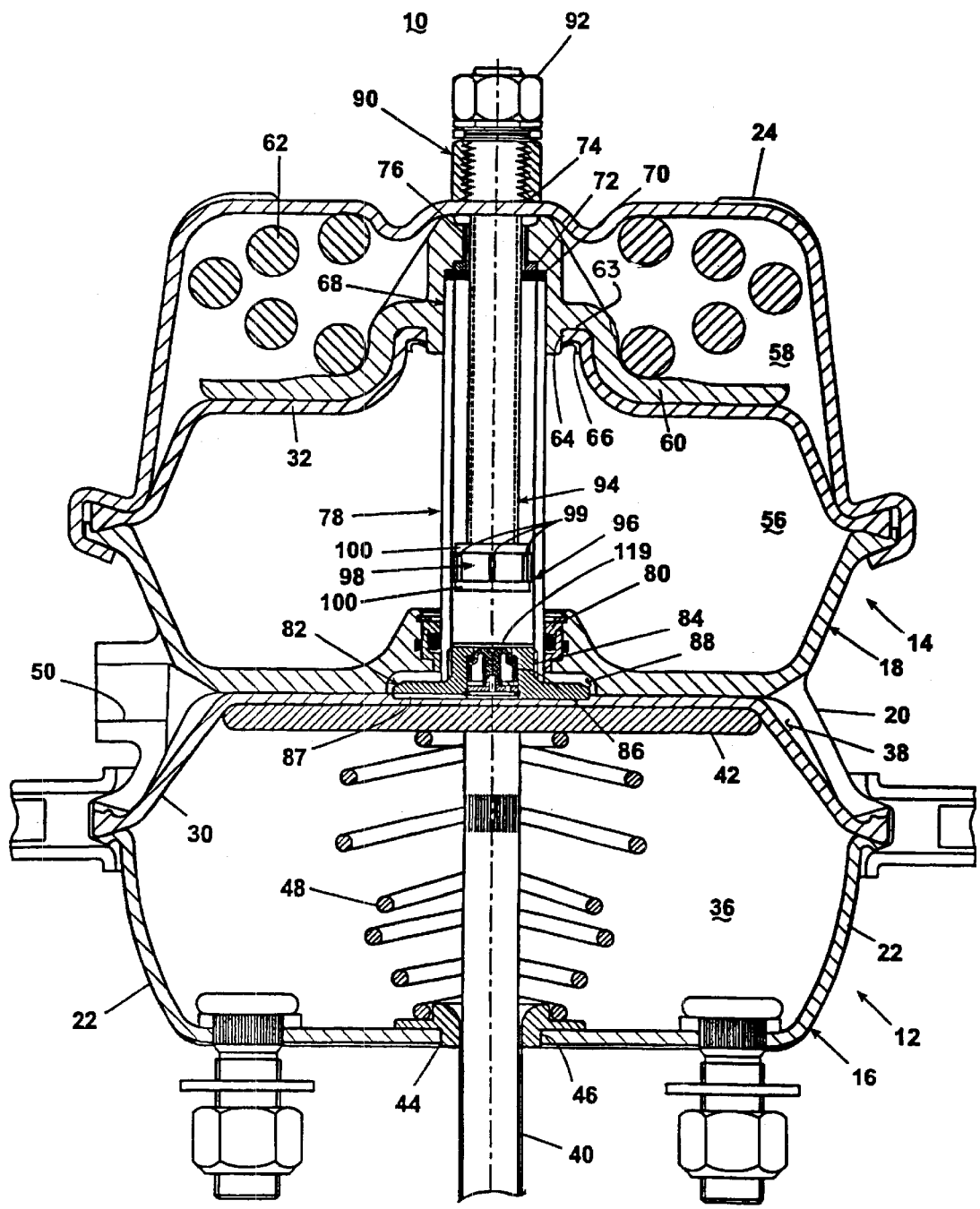
FIG. 1 illustrates a sectional view of a tandem-type air-operated brake actuator according to the invention and illustrating a one-way valve for controlling fluid flow from a spring chamber to the service chamber.

FIG. 1 illustrates a tandem-type air-operated brake actuator 10 comprising a service brake actuator 12 in combination with a spring brake actuator 14. The service brake actuator 12 applies and releases the service or operating brakes of a vehicle. The spring brake actuator 14 is used to apply the emergency or parking brakes of the vehicle.

Both the service brake actuator 12 and the spring brake actuator 14 comprise a housing 16, 18, which are formed by an adapter housing 20 to which are coupled a service brake cover 22 and a spring brake cover 24, respectively. The adapter housing 20 defines a common dividing wall separating the service brake housing 16 from the spring brake housing 18 while forming a portion of each. It is within the scope of the invention for the adapter housing 20 to be replaced with discrete cover elements, much like the service brake cover 22 and the spring brake cover 24.

Movable members, which in this embodiment include elastomeric diaphragms 30, 32, span the interior of the service and spring brake housings 16, 18, respectively, by having a peripheral edge of the diaphragm compressibly retained between the adapter housing 20 and the corresponding service and spring brake covers 22, 24. It will be understood that the invention will also apply to a piston-type brake where instead of a diaphragm, a piston spans the interior of a cylindrical spring brake housing.

Looking specifically at the service brake actuator 12, the diaphragm 30 fluidly divides the service brake actuator 12 into a pushrod chamber 36 and a pressure chamber 38. A pushrod 40, having a pressure plate 42 disposed at one end, is provided within the pushrod chamber 36, with the pressure plate 42 abutting the diaphragm 30 and the pushrod 40 extending through a bearing 44 disposed in an opening 46 in the service brake cover 22. A return spring 48 is disposed between the bearing 44 and the pressure plate 42 to aid in biasing the pressure plate 42 along with the pushrod 40 into the interior of the service brake housing 16. Although not shown, in an S-cam brake assembly, the end of the pushrod 40 is coupled to a slack adjuster of an S-cam brake assembly whereby the reciprocation of the pushrod 40 relative to the service brake housing 16 results in the application and release of the service brakes.

The pressure chamber 38 is fluidly connected to a source of pressurized air through an inlet port 50. As the operator of the vehicle applies the brake pedal, pressurized air is introduced or exhausted from the pressure chamber 38 through the inlet port 50 to reciprocate the pushrod 40. The addition of pressurized air into the pressure chamber 38 urges the pressure plate 42 and pushrod 40 from the adapter housing 20 toward the service brake cover 22 to apply the service brakes.

Looking more closely at the spring brake actuator 14, the diaphragm 32 fluidly divides the spring brake housing 18 into a pressure chamber 56 and spring chamber 58. The pressure chamber 56 is fluidly connected to a source of pressurized air through a port that is not shown in the drawings, but is substantially identical to port 50. Typically, the pressure chamber 56 is supplied by a pressurized air system that is physically distinct from the pressurized air system supplying the service brake actuator 12.

A pressure plate 60 is provided in the spring chamber 58, with a large force compression spring 62 disposed between the pressure plate 60 and the spring brake cover 24. The pressure plate 60 comprises an annular groove 63 in which is received an inner radial edge 64 of the diaphragm 32. A retaining ring 66 is press fit within the annular groove 63 to retain the inner edge 64 of the diaphragm 32 to the pressure plate 60. The pressure plate 60 further includes an axial stepped opening 68 in which are defined an actuator rod shoulder 70 and a bearing shoulder 72. The axial opening 68 is aligned with an opening 74 in the spring brake cover 24.

An annular bearing 76 is mounted within the axial opening 68 and located by contacting the bearing shoulder 72. A hollow actuator rod 78 has one end press fit within the axial opening 68 and positioned by abutting the actuator shoulder 70. The other end of the actuator rod 78 extends through a bearing and seal assembly 80 disposed within an opening 80 formed in the adapter housing 20. The bearing and seal assembly 80 are well known.

The transfer plate 82 closes the end of the actuator rod 78 opposite the pressure plate 60. The transfer plate 82 includes a threaded protrusion 84 that is threadably received within the interior of the actuator rod 78 and houses a one-way valve 86 according to the invention. Radially extending fluid channels 87 are formed in the lower face of the transfer plate 82, which is preferably sized to be received within a recess 88 in the adapter housing.

The brake actuator further comprises a caging bolt assembly 90 comprising an adjustment nut 92 threaded onto and permanently affixed to a caging bolt 94 which terminates in a caging bolt head 96. The caging bolt assembly couples the pressure plate and actuator rod to the spring brake actuator 14 by placing the caging bolt 94 and caging bolt head 96 within the interior of the actuator rod 78, extending the other end of the caging bolt 94 through the axial opening 68, threading the caging bolt through a cap 97, which is riveted to the spring brake head 24, and the adjustment nut 92 is permanently affixed on the caging bolt. Since the nut 92 and caging bolt head 96 are greater in diameter than the minor diameter of the passage 68, the caging bolt couples the pressure plate to the spring brake head 24.

The caging bolt head 96 preferably includes a bearing 98 disposed between opposing collars 100. The bearing 98 contacts the inner surface of the actuator rod 78 to prevent the collars 100 and caging bolt 94 from contacting the interior of the actuator rod 78 while helping to guide the reciprocal movement of the actuator during the application and release of the emergency brakes. Axial slots 99 are formed in the face of the bearing to form a fluid flow path around the bearing.

The caging bolt assembly 92 is used to mechanically retract and hold the large force compression spring 62 in a compressed state. By turning the adjustment nut 92, it is possible to threadably withdraw the caging bolt out of the spring brake housing 18. As the caging bolt is withdrawn, the caging bolt head 96 contacts the shoulder 70 at the upper end of the actuator rod 78 to withdraw the actuator and pressure plate along with the caging bolt and thereby compress the spring. The caging of the large force compression spring is well known and typically used during the assembly of the brake actuator and/or for the mechanical release of the brakes in the case of a failure or absence of the compressed air system.

Figure 2:
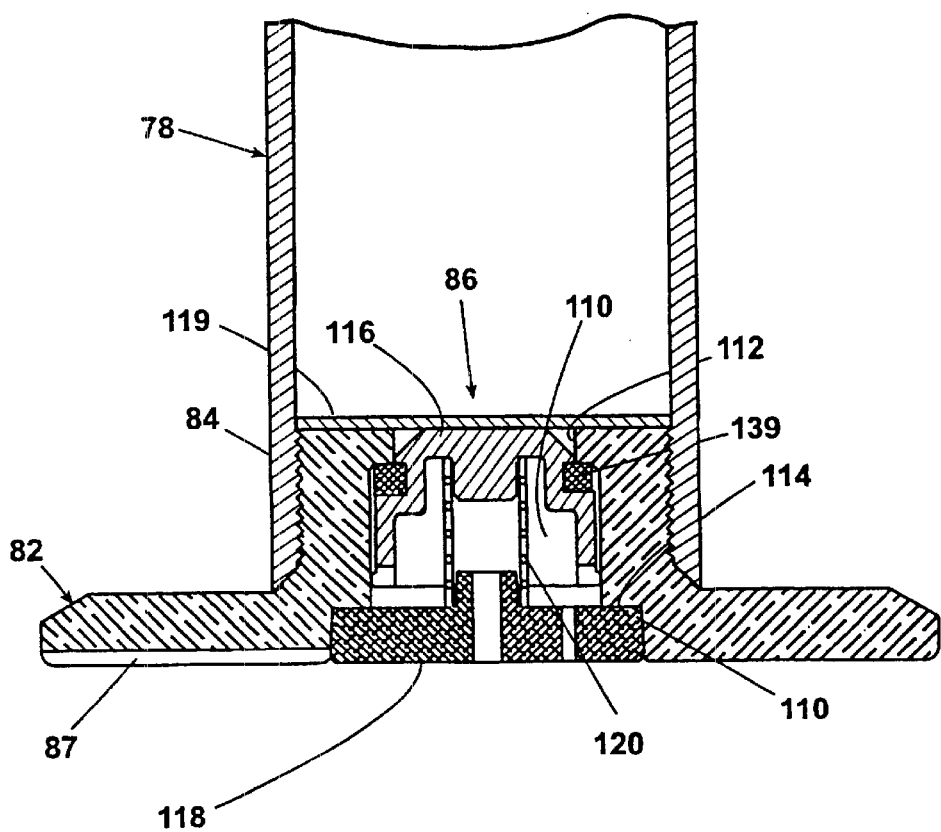
FIG. 2 is an enlarged view of the one-way valve of FIG. 1, illustrating the valve body, poppet, retainer, and spring of the one-way valve.

Referring to FIG. 2, the one-way valve 86 is examined in greater detail. The threaded protrusion 84 effectively functions as a valve body and defines an axial opening 110 into which extends a radial shoulder 112 at one end and in which is formed a radial seat 114 at another end. A poppet 116 is slidably received within the axial opening 110 and contained therein by a retainer 118. A coil spring 120 is disposed between the poppet 116 and the retainer 118 to bias the poppet 116 away from the retainer 118 and into contact with the radial shoulder 112.

An optional filter 119 is mounted to the body and overlies the axial opening. The filter is preferably made from acrylic and has a pressure sensitive adhesive backing to secure the filter to the body.

Referring also to FIGS. 3–6, the poppet 116 comprises a hollow body 130 connected to a head 132 by a neck 134. The head 132 effectively closes one end of the hollow poppet body 130. A radial guide rib 136 extends from the open end of the poppet body 130. A plurality of radially-spaced body openings 138 are formed in the body 130 and effectively divide the guide rib 136 into multiple sectors.

An O-ring 139 (FIG. 2) is disposed about the neck 134 and seals against the radial shoulder 112. The O-ring seal preferably has a square-shaped cross section, but can have any cross section so long as it seals properly.

The poppet head 132 is of a smaller diameter than the body 130 and the guide rib 136. A plurality of channels 140 extend from an upper surface of the poppet head 132 through a sidewall of the head. The channels 140 are preferably radially spaced about the head 132 so that they axially align with the body openings 138. The channels extend from an upper surface 132A of the head to a peripheral side surface 132B. The channel 140 terminates on the side surface 132B just above the junction of the head 132 and the neck 134 so that a gap 132C is defined between the neck 134 and the channel 140. The body openings 138 and the channels 140 combine to help form a fluid flow path around the poppet 116.

An embossment 142 extends away from the poppet head 132 into the hollow interior of the poppet body 130 and, in combination with the neck 134, defines an annular channel 144 sized to receive an end of the coil spring 120 while the embossment 142 is received within the interior of the coil spring 120.

Figure 7:
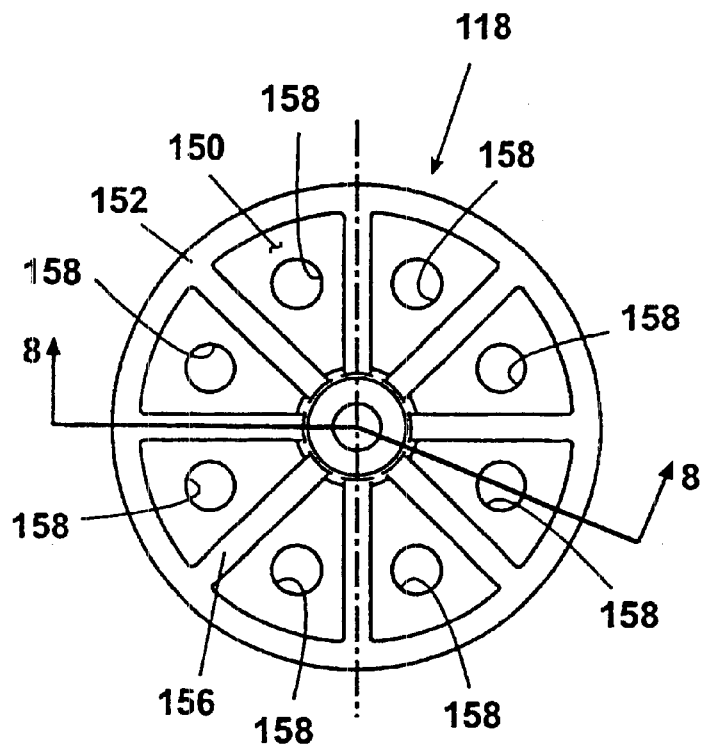
FIG. 7 is a top view of the retainer shown in FIG. 2.
Figure 8:
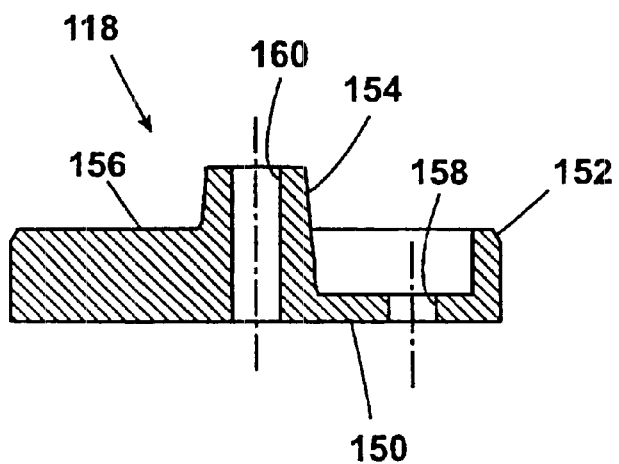
FIG. 8 is a sectional view taken along line 8—8 of FIG. 7.

FIGS. 7 and 8 illustrate the retainer 118 in greater detail. The retainer 118 comprises a bottom wall 150 from which extends a peripheral wall 152 and a centrally located hub 154. A series of radially extending strengthening ribs 156 extend from the hub 154 to the peripheral wall 152 dividing the bottom wall 150 into a plurality of sectors. Each sector has an opening 158 that extends through the bottom. The hub 154 extends above the strengthening ribs 156 and includes an axial opening 160. The hub is preferably tapered and sized to receive an end of the coil spring 120. The embossment 142 and the hub 154 function to retain the coil spring therebetween.

When assembled, the retainer 118 is press fit within the axial opening 110 in the transfer plate 82. The coil spring 120 receives the embossment 142 and the hub 154. The coil spring 120 biases the poppet 116 toward the radial shoulder 112 so that the poppet head 132 abuts the shoulder to seal the axial opening 110 and prevent fluid flow from the spring chamber 58, through the actuator rod 78, and out the one-way valve 86.

In operation, the coil spring 120 naturally biases the poppet 116 so that the poppet head 132 seals the axial opening 110 preventing the outflow of pressurized air from the spring chamber 58. As the parking brakes are released, pressurized air enters the pressure chamber 56 of the spring brake actuator 14. As the volume of the pressure chamber 56 increases, the volume of the spring chamber 58 decreases, increasing the pressure of the air contained therein. The pressurized air in the spring chamber is fluidly connected to the one-way valve 86 through the axial opening 68 of the pressure plate 60. As the pressure increases in the spring chamber 58, it can reach a point where it overcomes the force of the coil spring 120 acting on the poppet 116 to move the poppet 116 axially against the force of the spring 120 and unseat the O-ring 139 and channels 140 from the radial shoulder 112, permitting fluid flow around the poppet 116 through the fluid paths created by the body openings 138 and channels 140, and into the service brake pressure chamber 38 through the openings 158 and 160 of the retainer.

The poppet 116 need only move an axial distance approximately equal to the gap 132C to establish fluid flow around the head. Since the coil spring increases in its resistance force as it is compressed, the greater the axial travel of the poppet for establishing fluid communication around the head 132 will require a greater cracking pressure to overcome the increased resistance of the spring.

It is preferred that the poppet move a sufficient distance to unseal or "crack" the poppet head 132 at less than 2 psig, and most preferably between 0.5–1.0 psig. The shape and wire diameter of the spring 120 can be controlled to obtain the desired cracking pressure. The length of the gap 132C can also be changed to control the cracking pressure by requiring more or less axial movement before the poppet cracks.

The air system supplying the spring brake actuator 14 is normally separate from the air system supplying the service brake actuator 12. The separate air systems are traditionally controlled such that the service brake pressure chamber is fluidly open to atmospheric pressure when the spring brake is applied and released.

The one-way valve simply and efficiently relieves any pressure build-up in the spring chamber 58. However, the one-way valve does not relieve a vacuum created by the application of the brake upon the exhaustion of air from the pressure chamber 56. The build-up of any pressurized air must be addressed to ensure that the parking brake applies fully and timely. Since the spring brake actuator 10 is sealed and no fluid flow solution is provided to eliminate the vacuum or low pressure, another solution is required.

The invention addresses the vacuum or low pressure problem by increasing the force applied to the pressure plate of a magnitude sufficient to overcome the maximum retarding force created by the vacuum or low pressure in response to the application of the brakes. Preferably, the large force compression spring 62 is selected such that it applies a much larger force, about 1,750 lbs., than a typical large force compression spring, about 1,550 lbs., of the type that would be used if the spring chamber were vented. The additional spring force from the large force compression spring 62 overcomes any counter force attributable to a vacuum to apply the emergency brakes within the desired application time.

The needed increase of magnitude of the large force compression spring can be determined by measurement or by calculation of the pressure differential across the spring brake diaphragm at brake release (spring is caged) and application (spring is released), using the formula $P_1V_1 = P_2V_2$ where the $_1$ refers to the state of the spring brake actuator when the spring is caged, and the $_2$ refers to the state of the spring brake actuator when the spring is released. For the most commonly sold spring brake actuator, using this formula and knowing that the spring brake spring chamber has a volume of 45 in.$^3$ when the spring is caged and a volume of 120 in.$^3$ when the spring is released along with knowing that $P_1$ equals atmospheric pressure of 14.7 psi (the spring brake actuator is normally assembled under atmospheric conditions with the spring in the caged position), the pressure $P_2$ in the spring chamber after the spring is released is 5.5 psi.

When the spring is in the released position, the pressure in the pressure chamber 56 equals atmospheric pressure since the pressure chamber 56 is open to atmosphere upon the application of the parking brakes. Under normal atmospheric conditions, the pressure difference across the diaphragm in the caged position is 9.2 psi acting against the force of the spring 62. Since the diaphragm has an effective area of 30 in², the force associated with the pressure differential is approximately 276 lbs. Therefore, for a common embodiment of the invention, the spring 62 should apply a force of approximately 276 lbs. greater than a similar spring used in a vented spring brake actuator. Similar calculations are easily done to brake actuators with other dimensions.

Given that the brake 10 does not provide a fluid solution for relieving the vacuum, the function of the one-way valve is more critical to the operation of the brake than in prior two-way valve designs. The additional spring force from the large force compression spring increases the "hold off" pressure that must be reached in the pressure chamber 56 to compress the large force compression spring 62. The sum of the large force compression spring and the pressure build-up in the spring chamber 58 cannot exceed the minimum pressure generated by the pressure chamber for the brake to work properly. Therefore, it is important to the invention that the one-way valve work properly.

It is also important to understand that the amount of pressure build-up and vacuum in the spring chamber 58 will vary depending on the operating circumstances of the brake actuator. Even though the brake actuator 10 is sealed, there will be some very slow leakage, typically along the interface between the threads of the caging bolt and the head. If the brake actuator sits for long periods of time, such as parked overnight or longer, it is possible that any vacuum or low pressure in the expanded spring chamber will be relieved and the expanded spring chamber will equalize with atmospheric pressure. The additional air in the spring chamber will exacerbate the pressure build-up when the emergency brake is released and the volume of the spring chamber is reduced, making the role of the one-way valve even more important to the proper operation of the brake actuator.

Figure 9:
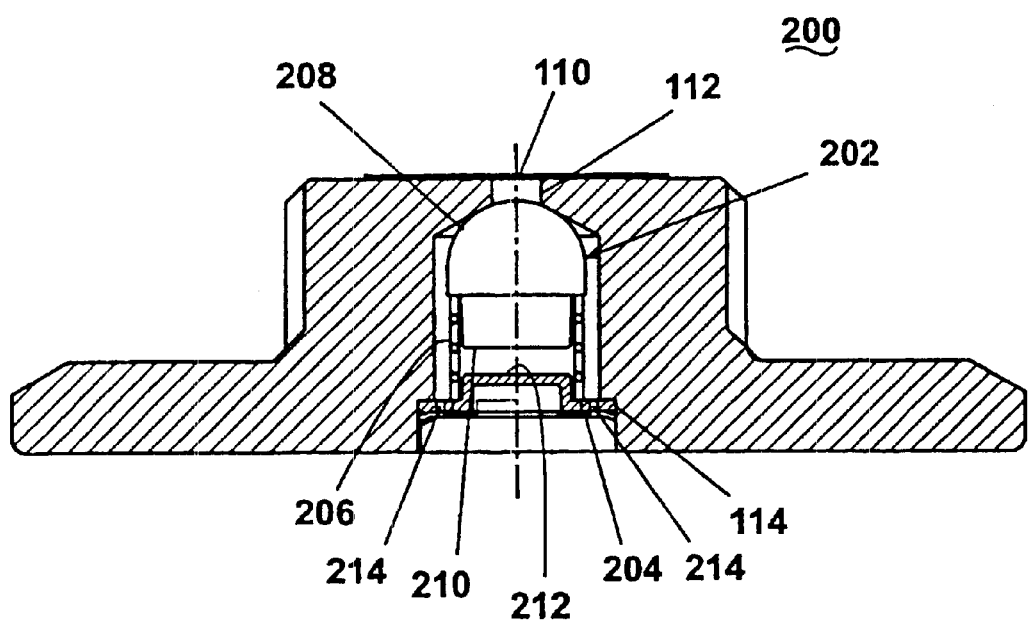
FIG. 9 illustrates an alternative embodiment of the one-way valve.

FIG. 9 illustrates a second embodiment of a one-way valve 200 according to the invention. The second embodiment 200 is substantially similar to the first embodiment and only the major differences will be described. Further, like parts in the second embodiment will share numerals with like parts in the first embodiment.

In the second embodiment, the one-way valve comprises a poppet 202 biased away from a retainer 204 by a coil spring 206. The poppet 202 comprises a semi-hemispherical head 208 from which extends an embossment 210. The retainer 204 comprises a protrusion 212. The coil spring 206 receives the embossment 210 and protrusion 212 and biases the head 208 of the poppet into sealing engagement with respect to the radial shoulder 112.

In operation, as the pressure increases in the spring chamber 58, it eventually reaches a magnitude that cracks or unseals the head 208 from the radial shoulder 112 permitting fluid flow from the spring chamber 58, through the axial opening 110, around the poppet 202, through the openings 214 in the retainer 204, where the fluid is exhausted into the pressure chamber 38 of the service brake actuator.

Figure 10:
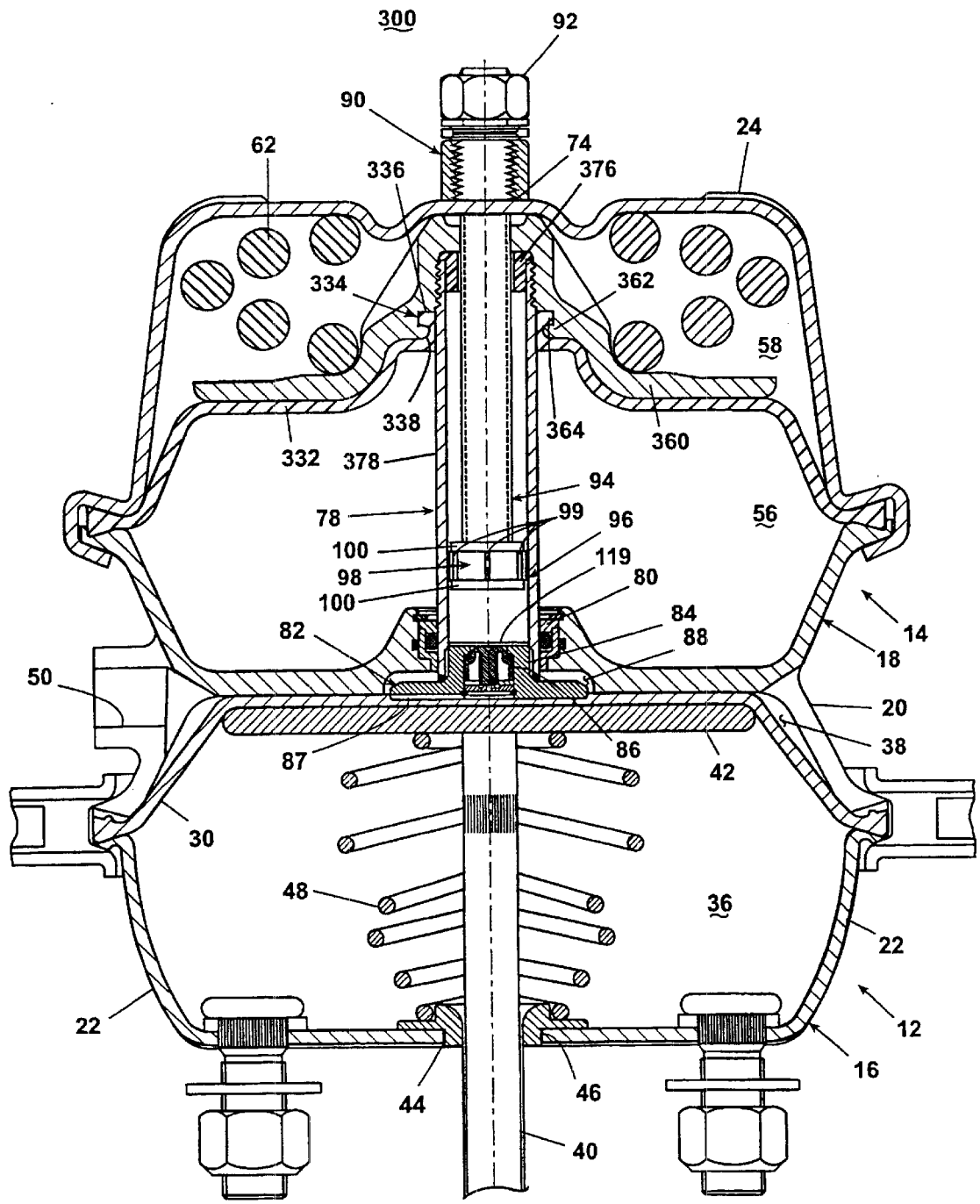
FIG. 10 is a sectional view of a second embodiment tandem-type air-operated brake actuator according to the invention and illustrating a one-way valve controlling fluid flow from the spring chamber to the service chamber.

FIG. 10 illustrates a second embodiment of the tandem-type air-operated brake actuator 300 according to the invention, and contains many elements that are identical to those of the first embodiment 10. Therefore, like parts will be used to identify like elements in the two embodiments.

Figure 11:
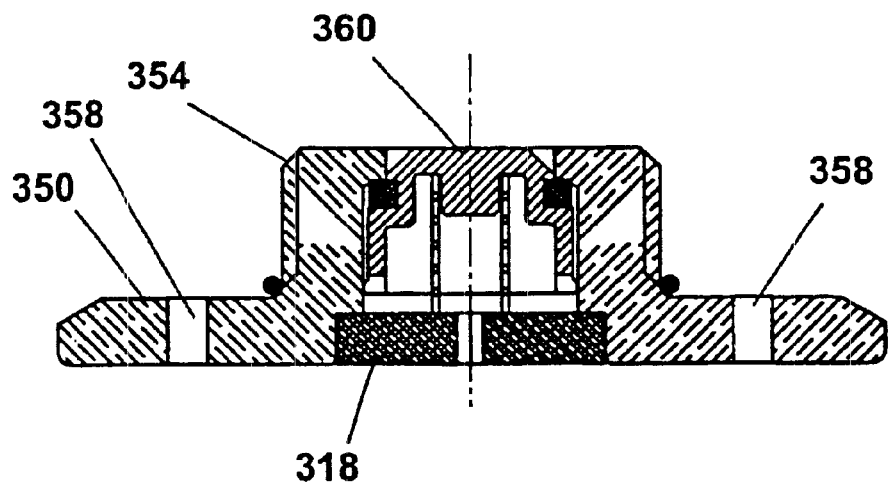
FIG. 11 is an enlarged view of the one-way valve of FIG. 10, illustrating a valve body, poppet, retainer, and spring of the one-way valve.
Figure 12:
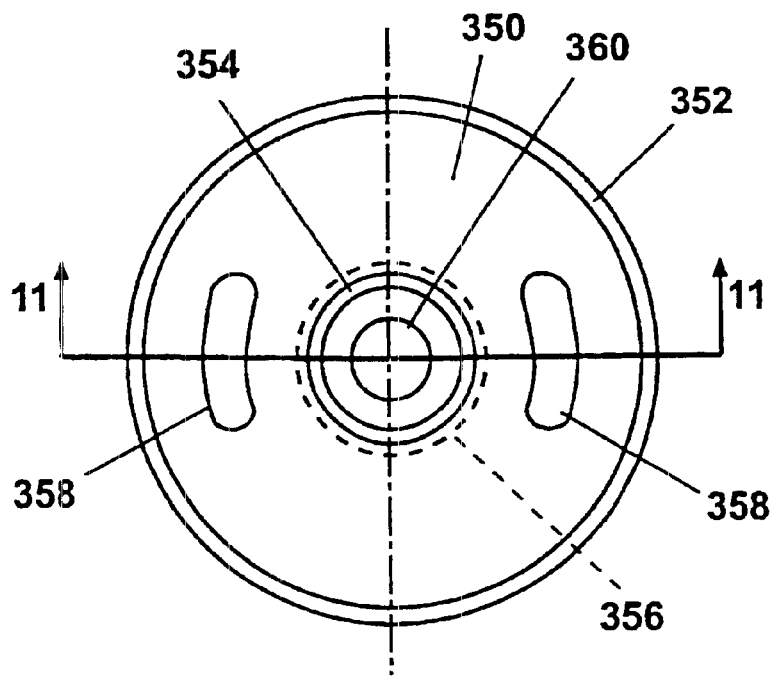
FIG. 12 is a top view of the retainer of FIG. 11.
Figure 13:
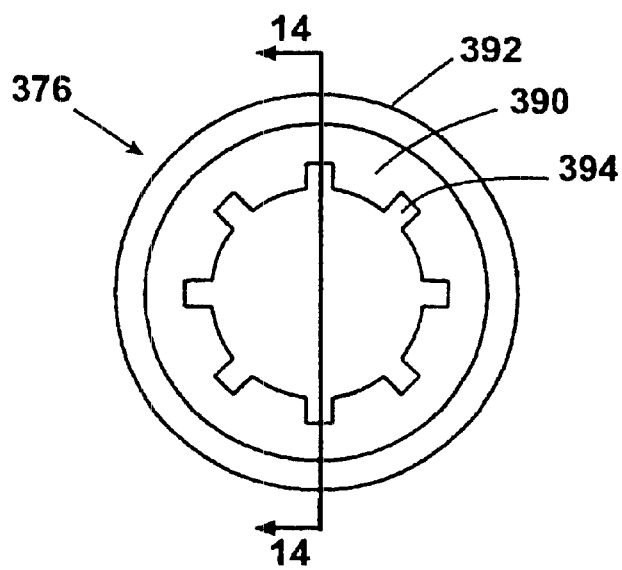
FIG. 13 is an enlarged sectional view of a flange guide positioned between an actuator shaft and a caging bolt of the spring brake actuator of FIG. 10.
Figure 14:
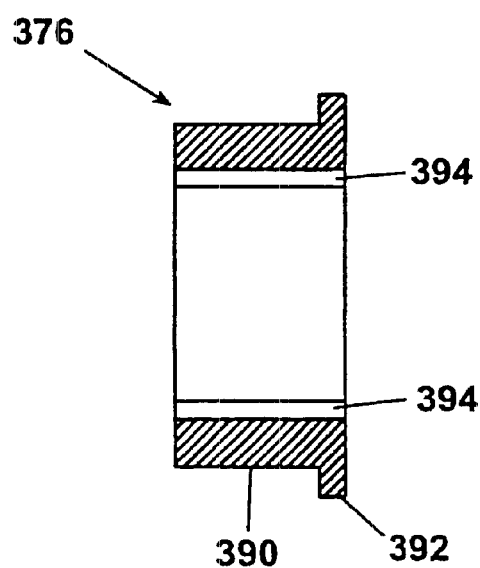
FIG. 14 is a top view of the flange guide of FIG. 13.

One difference between the first embodiment and second embodiment spring brake actuators 10 and 300 lies in the one-way valve structure and, specifically, in the shape of the retainer 318. FIGS. 10–12 illustrate the alternative configuration for the retainer 318. The retainer 318 is substantially a constant-thickness, planar disk in which is formed a central opening 320 and through openings 322. The retainer 318 does not have a guide for the spring as does the retainer 118.

The main difference between the first and second embodiments of the spring brake actuator lies in the structure and assembly of the diaphragm 332, pressure plate 360, flange guide 376, and the hollow actuator rod 378. The spring brake diaphragm 332 comprises an inner edge defined by an annular collar 334 having a radial lip 336, which defines an annular groove 338 between the annular lip 336 and the main portion of the diaphragm. Correspondingly, the pressure plate 360 has an annular rib 362 and an annular groove 364 formed in the passage 68 that are complementary to the annular groove 338 and annular rim 336 of the diaphragm, thereby permitting the diaphragm 332 to be mounted to the pressure plate 360, without the need for an additional retainer 66 as used in the first embodiment.

The hollow actuator rod 378 differs from the actuator 78 in that the upper end of the hollow actuator rod 378 is threaded as is the corresponding portion of the pressure plate to permit the hollow actuator rod to be assembled to the pressure plate by threading the hollow actuator rod to the pressure plate. The flange guide 376 performs the same function as the annular bearing 76 in that it spaces the caging bolt 94 from the pressure plate 360. However, the flange guide 376 differs in that its axial body portion extends into the interior of the threaded end of the hollow actuator rod 378 and a shoulder portion is trapped between the pressure plate and the end of the hollow actuator rod. The flange guide also include axial channels 390 that create fluid flow paths around the caging bolt 94. The channels 390 extend the entire length of the flange guide interior.

The operation of the second embodiment spring brake actuator 300 is identical to the operation previously described for the first embodiment. Therefore, the operation of the second embodiment spring brake actuator 300 will not be described in detail. It should be noted that the various components of the spring brake actuator 10 and spring brake actuator 300 can be substituted for one another as needed or desired.

An advantage of the sealed air-operated brake actuator 10 according to the invention is that the spring brake actuator 14 is completely sealed with respect to the atmosphere. The one-way valve permits the relief of pressure in the spring chamber in response to the releasing of the brakes. The large force compression spring 62 generates a spring force that is sufficient to overcome the effects of a vacuum that might form within the spring chamber 58 upon the application of the parking brakes. The combination of the extra-large force compression spring to overcome the vacuum and the one-way valve to relieve any pressure build-up in the spring chamber permits a completely sealed spring brake actuator 14 that does not suffer operationally because of the vacuum or pressure build-up in the spring brake chamber.

While the invention has been specifically described in connection with certain specific embodiments thereof, it is to be understood that this is by way of illustration and not of limitation, and the scope of the appended claims should be construed as broadly as the prior art will permit.

What is claimed is:

1. An air-operated diaphragm brake actuator for applying the parking brakes of a vehicle, of the type comprising:

a sealed housing comprising a first end wall, a peripheral side wall extending away from the first end wall to define a first interior cavity, and a second end wall, opposing the first end wall and closing the first interior cavity;

a diaphragm having a central opening, spanning the interior cavity, and dividing the interior cavity into a spring chamber located between the diaphragm and the first end wall, and a pressure chamber located between the diaphragm and the second end wall, the pressure chamber being adapted for connection to a source of pressurized fluid where the diaphragm is in a first position when the pressure chamber is exhausted and a second position when the pressure chamber is pressurized;

a spring disposed in the spring chamber and biasing the diaphragm in a direction toward the second end wall away from the first position where the spring is compressed, toward the second position where the spring is less compressed;

a hollow actuator rod having one end coupled to the diaphragm at the central opening and another end extending through the second end wall to establish fluid communication between the spring chamber and a side of the second end wall opposite the pressure chamber, wherein when the diaphragm is in the second position the hollow actuator rod is positioned to apply the parking brake and when the diaphragm is in the first position the hollow actuator rod is positioned to release the parking brake; and a one-way valve positioned within the hollow actuator rod to permit the exhausting of fluid from the spring chamber through the hollow actuator rod and prevent the introduction of fluid through the hollow actuator rod and into the spring chamber, the one-way valve including a body having a through opening and positioned within the hollow actuator rod to block fluid flow through the hollow actuator rod except through the through opening, and a poppet mounted within the through opening and moveable between a sealing position where the poppet seals the through opening to prevent the flow of fluid through the body, and an open position where the poppet unseals the through opening to permit the flow of fluid through the body;

whereby when the pressurized fluid is introduced into the pressure amber, the diaphragm moves from the second position to the first position to reduce the volume of the spring chamber and, as the resulting fluid pressure increase in the spring chamber exceeds a predetermined value, the one-way valve opens to permit the pressurized fluid to pass from the spring chamber and through the hollow actuator rod thereby relieving pressure in the spring chamber.

2. The brake actuator according to claim 1 wherein the spring is sized to apply a spring force sufficient to negate the impact of a retarding force attributable to the sealed spring chamber on an application time defined by the time to move the diaphragm between the first and second positions upon exhaustion of fluid from the pressure chamber.

3. The brake actuator according to claim 2 wherein the retarding force equals the force opposing the expansion of the spring attributable to the pressure differential between the pressure chamber and the spring chamber when the diaphragm is in the second position.

4. The brake actuator according to claim 3 wherein retarding force is at least 275 lbs.

5. The brake actuator according to claim 1 wherein the body comprises an annular collar extending into the body through opening and the one-way valve further comprises a biasing device biasing the poppet into abutting relationship with the collar to seal the through opening when the poppet is in the sealing position.

6. The brake actuator according to claim 5 wherein the biasing device applies a force to the poppet than can be overcome by a cracking pressure of less than 2 psig across the poppet to move the poppet out of abutting relationship to the unsealed position.

7. The brake actuator according to claim 6 wherein the cracking pressure is between 0.5 and 1 psig.

8. The brake actuator according to claim 5 wherein the one-way valve further comprises a retainer mounted to the body, and the biasing device is a spring disposed between the retainer and the poppet.

9. The brake actuator according to claim 8 wherein the retainer comprises multiple openings fluidly connecting the body through opening to the side of the second end wall opposite the pressure chamber.

10. The brake actuator according to claim 5 wherein the body is mounted in the end of the hollow actuator rod nearest the second end wall.

11. The brake actuator according to claim 5 wherein the collar has an edge face that defines an inlet opening to the body, and the poppet comprises a head having a top surface, a peripheral wall extending away from the top surface and sized to be received within the inlet opening and conform to the edge face, and multiple channels extending from the top surface and terminating at the peripheral wall, wherein, when the poppet is in the sealing position, the edge face blocks the channels to prevent fluid flow around the poppet, and when the poppet is in the unsealed position, a portion of the channel terminating in the peripheral wall extends beyond the collar to permit fluid flow around the poppet.

12. The brake actuator according to claim 11 wherein the poppet further comprises a base connected to a head, the base having an exterior periphery greater than the inlet opening to prevent the passage of the poppet through the inlet opening.

13. The brake actuator according to claim 12 wherein the base exterior periphery is smaller than the through opening to permit fluid to flow around the base when the one-way valve is open.

14. The brake actuator according to claim 13 wherein the base further comprises an annular guide rib having an outer periphery shaped so that the annular guide rib abuts the through opening and the head peripheral wall and the annular guide rib orients the poppet relative to the through opening.

15. The brake actuator according to claim 14 wherein the base is hollow and further comprises multiple passages extending through the base to establish fluid communication between the body through opening and the interior of the base.

16. The brake actuator according to claim 12 wherein the poppet further comprises a neck connecting the head and the base and the junction of the head, neck, and base form a seat, and a seal is mounted to the seat, the seal contacts the collar and further seals the poppet to the body when the poppet is in the sealing position.

17. The brake actuator according to claim 1 and further comprising a filter mounted to the one-way valve body.

18. The brake actuator according to claim 17 wherein the filter is mounted to the body by an adhesive.

19. The brake actuator according to claim 1 wherein the housing comprises first and second housing members, each having an annular rim, with the annular rims being coupled together to form the housing, and the diaphragm has a peripheral edge compressed between the annular rims.

20. The brake actuator according to claim 19 further comprising a pressure plate positioned within the spring chamber between the spring and the diaphragm, and abutting the diaphragm.

21. The brake actuator according to claim 20 wherein the pressure plate has an axial passage in fluid communication with the spring chamber and the one end of the hollow actuator rod extends through the central opening and is received within the pressure plate axial passage to mount the hollow actuator rod to the pressure plate and establish fluid communication between the spring chamber and the hollow actuator rod.

22. The brake actuator according to claim 21 wherein the central opening defined by an inner edge that is connected to the pressure plate such that the central opening aligns with the pressure plate axial opening and the hollow actuator rod passes through the central opening.

23. The brake actuator according to claim 22 wherein the diaphragm inner edge is received within an annular channel within the pressure plate to mount the diaphragm to the pressure plate.

24. The brake actuator according to claim 23 and further comprising a retainer positioned within the pressure plate annular channel to press the diaphragm inner edge against the pressure plate to mount the diaphragm to the pressure plate.

25. The spring brake according to claim 23 wherein the diaphragm inner edge has a collar with an annular rib and the pressure plate annular channel has an annular groove for receiving the annular rib to mount the diaphragm to the pressure plate.

26. The brake actuator according to claim 21 wherein the one end of the hollow actuator rod is press-fit within the pressure plate axial passage.

27. The brake actuator according to claim 21 wherein the one end of the hollow actuator has external threads and the pressure plate axial opening is tapped, and the hollow actuator rod is mounted to the pressure plate by threading the hollow actuator rod into the taped axial passage of the pressure plate.

28. The brake actuator according to claim 20 and further comprising a caging bolt assembly comprising an internally threaded guide mounted to the housing first end, a threaded shaft threaded into the guide and extending through the housing first end and into the hollow actuator rod, an adjustment nut mounted to an end of the shaft on the exterior of the housing, and a guide head mounted to an end of the shaft located within the actuator rod, whereby the actuator nut can be rotated to draw the head against the pressure plate and move the spring to the caged position.

29. The brake actuator according to claim 28 wherein the guide is riveted to the housing first end.

30. The brake actuator according to claim 29 wherein the caging bolt head includes axial grooves to permit fluid flow through the actuator shaft and around the head.

31. The brake actuator according to claim 30 wherein the caging bolt head comprises a bearing sized to substantially fill the interior of the hollow actuator rod and the grooves are formed in the bearing.

32. The brake actuator according to claim 28 and further comprising an annular bearing mounted within one of the pressure plate passage and the hollow actuator rod and having an axial opening through which the caging bolt passes to prevent the caging bolt from contacting the pressure plate during the application of the parking brake.

33. The brake actuator according to claim 1 and further comprising a service brake actuator comprising:

a second housing mounted in tandem to the first housing and comprising a first end wall adjacent the first housing second end wall, a peripheral side wall extending away from the first end wall to define a service brake interior cavity, and a second end wall, opposing the first end wall and closing the service brake interior cavity;

a second diaphragm spanning the service brake interior cavity and dividing the service brake interior cavity into a service brake pressure chamber located between the second diaphragm and the first end wall, and an actuator chamber located between the second diaphragm and the second end wall, the service brake pressure chamber being adapted for connection to a source of pressurized fluid where the second diaphragm is in a first position when the pressure chamber is exhausted and a second position when the pressure chamber is pressurized; and a pushrod having one end coupled to the second diaphragm and another end extending through the service brake second end wall and adapted to operably connect to a vehicle brake, and when the second diaphragm is in the first position the pushrod is adapted to apply the vehicle brakes and when the second diaphragm is in the second position the pushrod is adapted to release the vehicle brake;

wherein the hollow actuator rod extends through the service brake first end wall and into the service brake pressure chamber to fluidly connect the spring chamber with the service brake pressure chamber.

34. The brake actuator according to claim 33 wherein the second end of the hollow actuator rod abuts the diaphragm and moves the pushrod to the pushrod first position when the hollow actuator is in the extended position to thereby apply the parking brake.

35. The brake actuator according to claim 33 wherein the first housing second end wall and the second housing first end wall are one.

36. The brake actuator according to claim 33 and further comprising a caging bolt assembly comprising an internally threaded guide mounted to the housing first end, a threaded shaft threaded into the guide and extending through the housing first end and into the hollow actuator rod, an adjustment nut mounted to an end of the shaft on the exterior of the housing, and a guide head mounted to an end of the shaft located within the actuator rod, whereby the actuator nut is adjustable to draw the head against the diaphragm and move the spring to the caged position.

37. The brake actuator according to claim 36 wherein the guide is riveted to the housing first end.

38. The brake actuator according to claim 1 and further comprising a filter disposed within the hollow actuator rod between the spring chamber and the one-way valve body.

39. The brake actuator according to claim 1 wherein the diaphragm further comprises a pressure plate positioned within the spring chamber and abutting diaphragm.

\* \* \* \* \*